US012585413B2

(12) United States Patent
Smith et al.

(10) Patent No.: US 12,585,413 B2
(45) Date of Patent: Mar. 24, 2026

(54) SINGLE-USE AUTHENTICATION CODE OF PRINTING DEVICE CONSUMABLE ITEM ASSEMBLY

(71) Applicant: Hewlett-Packard Development Company, L.P., Spring, TX (US)

(72) Inventors: Kenneth K. Smith, Boise, ID (US); Seung il Kim, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 160 days.

(21) Appl. No.: 18/682,908

(22) PCT Filed: Aug. 23, 2021

(86) PCT No.: PCT/US2021/047134
§ 371 (c)(1),
(2) Date: Feb. 10, 2024

(87) PCT Pub. No.: WO2023/027686
PCT Pub. Date: Mar. 2, 2023

(65) Prior Publication Data
US 2024/0345785 A1 Oct. 17, 2024

(51) Int. Cl.
*G06F 3/12* (2006.01)
*B41J 2/175* (2006.01)

(52) U.S. Cl.
CPC ........ *G06F 3/1239* (2013.01); *B41J 2/17509* (2013.01); *B41J 2/1754* (2013.01); *B41J 2/17546* (2013.01); *B41J 2/17553* (2013.01)

(58) Field of Classification Search
CPC .. B41J 2/17503; B41J 2/17509; B41J 2/1754; B41J 2/17546; B41J 2/17553; G06F 3/1203; G06F 3/121239; G06F 3/1285
See application file for complete search history.

(56) References Cited

U.S. PATENT DOCUMENTS

| | | | |
|---|---|---|---|
| 8,973,949 B2 * | 3/2015 | Lamboy | G09F 3/0292 |
| | | | 283/105 |
| 2002/0077979 A1 * | 6/2002 | Nagata | G06Q 10/06 |
| | | | 705/40 |
| 2004/0049468 A1 | 3/2004 | Walmsley | |
| 2006/0065710 A1 | 3/2006 | Endo et al. | |
| 2007/0055883 A1 | 3/2007 | Kruse | |
| 2011/0211849 A1 | 9/2011 | Okamoto | |
| 2012/0134686 A1 | 5/2012 | Jones et al. | |
| 2015/0110504 A1 | 4/2015 | Lee et al. | |
| 2015/0286453 A1 | 10/2015 | Thacker et al. | |

(Continued)

FOREIGN PATENT DOCUMENTS

| | | |
|---|---|---|
| JP | 2015-090531 A | 5/2015 |
| WO | 2020/022583 A1 | 1/2020 |

(Continued)

*Primary Examiner* — Anh T Vo
(74) *Attorney, Agent, or Firm* — Michael Dryja

(57) ABSTRACT

A printing device consumable item assembly includes a housing containing a consumable item that any compatible printing device uses to print, and a single-use authentication code on the housing. The single-use authentication code authorizes reloading or replacement of any consumable item of a same type as the consumable item within any compatible printing device.

10 Claims, 8 Drawing Sheets

(56) References Cited

U.S. PATENT DOCUMENTS

| | | |
|---|---|---|
| 2016/0027021 A1 | 1/2016 | Kerdemelidis |
| 2016/0082740 A1 | 3/2016 | Jeran |
| 2016/0131992 A1 | 5/2016 | Ignatchenko et al. |
| 2016/0266514 A1 | 9/2016 | Richards et al. |
| 2016/0342110 A1 | 11/2016 | Luke |
| 2017/0070642 A1 | 3/2017 | Miyamoto et al. |
| 2017/0123360 A1 | 5/2017 | Jeran et al. |
| 2017/0262721 A1 | 9/2017 | Richards et al. |
| 2018/0072064 A1* | 3/2018 | Kiyohara ............ B41J 2/17546 |
| 2018/0178452 A1 | 6/2018 | Costabeber |
| 2020/0042929 A1 | 2/2020 | Yu |
| 2020/0130359 A1 | 4/2020 | Kiyohara |
| 2024/0272842 A1 | 8/2024 | Mcdaniel et al. |

FOREIGN PATENT DOCUMENTS

| | | |
|---|---|---|
| WO | 2020/096643 A1 | 5/2020 |
| WO | 2020/180343 A1 | 9/2020 |

* cited by examiner

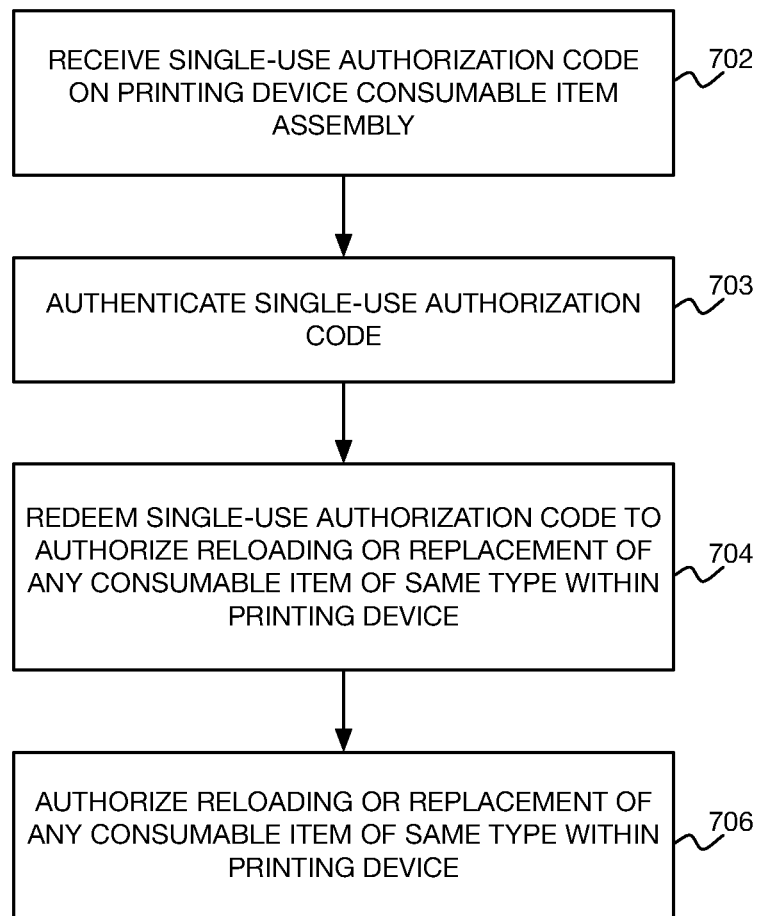

RECEIVE SINGLE-USE AUTHORIZATION CODE ON PRINTING DEVICE CONSUMABLE ITEM ASSEMBLY          702

AUTHENTICATE SINGLE-USE AUTHORIZATION CODE          703

REDEEM SINGLE-USE AUTHORIZATION CODE TO AUTHORIZE RELOADING OR REPLACEMENT OF ANY CONSUMABLE ITEM OF SAME TYPE WITHIN PRINTING DEVICE          704

AUTHORIZE RELOADING OR REPLACEMENT OF ANY CONSUMABLE ITEM OF SAME TYPE WITHIN PRINTING DEVICE          706

SINGLE-USE AUTHENTICATION CODE OF PRINTING DEVICE CONSUMABLE ITEM ASSEMBLY

BACKGROUND

Printing devices can use a variety of different technologies to form images on media such as paper. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner and ink (which can include other printing fluids or material as well).

BRIEF DESCRIPTION OF THE DRAWINGS

FIG. 7 is a flowchart of an example method.

DETAILED DESCRIPTION

Figure 1:
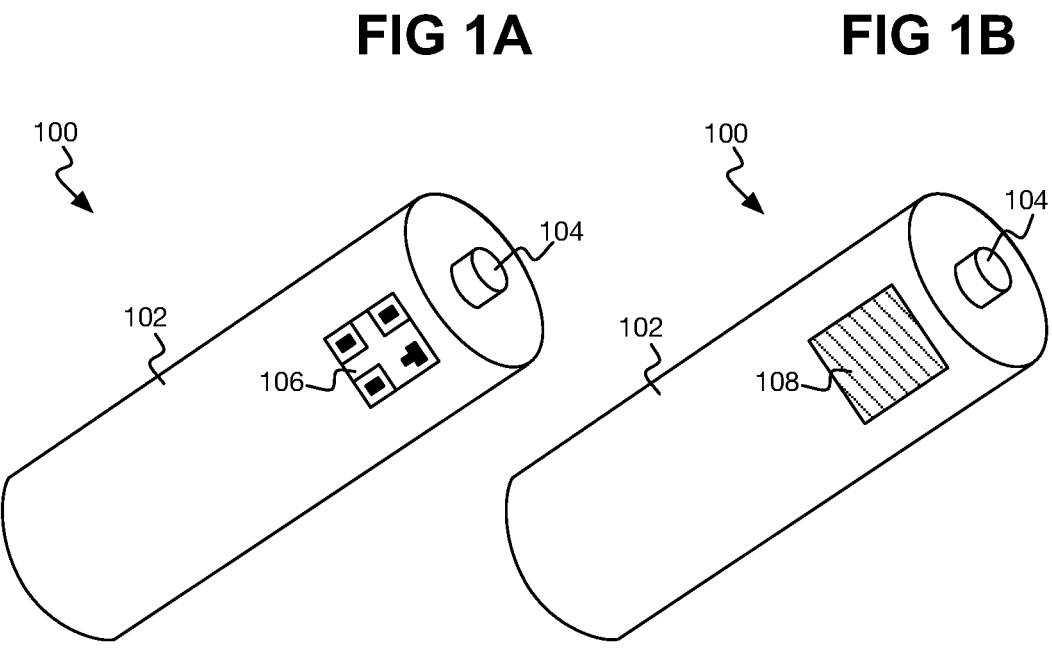
FIG. 1A is a diagram of an example printing device consumable item assembly having a single-use authentication code on its housing.
FIG. 1B is a diagram of the example consumable item assembly of FIG. 1A in which a scratch-off opaque covering is used to conceal the authentication code.
FIG. 1C is a diagram of the example consumable item assembly of FIG. 1A in which an irreversibly removable cap is used to conceal the authentication code.
FIG. 1D is a diagram of the example irreversibly removable cap after the cap has been removed from the assembly.

As noted in the background, printing devices deposit print material to form images on media or, in the case of three-dimensional (3D) printing devices, to additively build (3D) objects. A printing device can include a cartridge of print material that the device uses for printing. As the printing device prints print jobs, print material is consumed from the cartridge. When the cartridge is empty or is running low on print material, the cartridge may be replaced with a replacement cartridge that has a fresh (e.g., full) supply of print material. A cartridge is thus one type of a consumable item assembly that a printing device uses for printing.

In the case of a laser printing device, the cartridge may be a toner cartridge that includes a supply of toner as well as other components that the printing device uses for printing, such as a developer roller. In the case of an inkjet printing device, the cartridge may similarly be an inkjet cartridge that includes a supply of ink as well as other components that the printing device uses for printing, such as an inkjet printhead. In many cases, the developer roller, the organic photoconductor (OPC), toner transfer roller, and other mechanical interface components in case of a laser printing device, the inkjet printhead in the case of an inkjet printing devices, and more generally other components besides the actual print material (viz., the toner, ink, etc.) contained within the cartridge remain in good working condition even when the supply of print material becomes depleted.

Therefore, some types of printing devices use consumable item assemblies that include just supplies of print material. For example, a laser-printing device may use a toner reload kit that includes just a supply of toner and not a developer roller and/or other components that still have useful life even when the toner supply is depleted. Similarly, an inkjet-printing device may use an ink reload bottle that includes just one or multiple supplies of ink and not one or multiple inkjet printheads that still have useful life even when the ink supplies are depleted. The developer roller, inkjet printheads, etc., may be part of other end user-replaceable consumable item assemblies within the printing devices, or may not be meant to replaced by end users.

Printing device consumable item assemblies that include just supplies of print material can be manufactured and sold at lower cost than assemblies that also include other components like developer rollers or inkjet printheads. In general, however, a printing device consumable item assembly can include any item that is replaceable within a printing device, particularly by an end user, and that is consumed or depleted during usage of the printing device for printing. Other examples of printing device consumable item assemblies therefore include fuser assemblies, developer assemblies, transfer belts, OPCs, and so on, in the case of a laser-printing device, and fluid-ejection (e.g., inkjet) printheads in the case of a fluid-ejection (e.g., inkjet) device that employs separately replaceable printheads and fluid (e.g., ink) supplies.

To ensure that printing devices print with the best image and print quality possible, manufacturers advise users that they should use authorized consumable item assemblies within the devices. An authorized consumable item assembly can be one that is manufactured by or for the manufacturer of a printing device and acquired from a trusted party. A user purchasing such a consumable item assembly can therefore be certain that usage of the item within his or her printing device will result in the best performance possible, and will not damage the device.

A consumable item assembly that is manufactured by or for the manufacturer is an authentic consumable item assembly. Acquisition of the assembly from a trusted party ensures that the item has not been impermissibly modified or reused, such as by being refilled with print material by an unauthorized party. That is, an otherwise authentic consumable item assembly that is impermissibly refilled with print material can result in degraded image and print quality, and potentially damage the printing device, when reused in this manner. Acquisition from a trusted party further ensures that a counterfeit consumable item assembly will not be passed off as authentic.

To guard against unauthorized consumable item assemblies from being unknowingly used in printing devices, authentic consumable item assemblies may include authentication devices or other security features of varying sophistication by which the devices can verify that the items are indeed authentic. In certain cases, a printing device may prevent an assembly that fails authentication from being used, for instance, to prevent possible damage to the device, or for other reasons. In other certain cases, instead of preventing use of the consumables, the printing device may change operating parameters to a different mode to reduce the likelihood of device damage.

Such authentication devices can be in the form of security-hardened authentication integrated circuits (ICs) that contain information which can be authenticated by the printing devices, potentially in communication with a computing device operated by the manufacturer. Other authentication devices can be in the form of security tags, such as holograms, quality response (QR) codes, radio frequency identifier (RFID) and near-field communication (NFC) tags, and so on, including on the assemblies themselves. In this case, a printing device may verify that the consumable item assembly is authentic by reading, scanning, or communicating with the security tag.

Inclusion of an authentication device within a printing device consumable item assembly that a printing device itself has to verify as authentic can raise manufacturing costs in two ways, however. First, the printing device itself has to have the appropriate hardware in order to communicate with, read, or scan the authentication device of an assembly inserted into the device. The inclusion of this hardware within a printing device can raise the manufacturing costs of the printing device. Second, the manufacturing costs of the consumable item assembly itself may increase to accommodate the inclusion of the authentication device within the item, particularly in the case of a security-hardened IC. Manufacturers may be particularly sensitive to increased manufacturing costs for consumable item assemblies.

Techniques described herein ameliorate these issues via a single-use authentication code on a printing device consumable item assembly that contains a consumable item that any compatible printing device uses to print. The single-use authentication code can be authenticated without involvement of a printing device; that is, the printing device does not itself authenticate the authentication code. The authentication code authorizes reloading or replacement of any consumable item of a same type as the consumable item contained within the assembly, within any compatible printing device. Because the authentication code is a single-use authentication code, the code authorizes a single instance of consumable item reloading or replacement.

The reloading of a consumable item in a printing device includes the transfer of the consumable item, such as print material, from a printing device consumable item assembly to the printing device to refill the printing device with the consumable item. For example, the consumable item assembly may be connected to the printing device, the consumable item may be transferred from the assembly to the printing device, and then the assembly may be disconnected from the printing device. The printing device can then print using the reloaded consumable item, even though the assembly has been removed from the printing device.

The replacement of a consumable item in a printing device includes the installation of the printing device consumable item assembly in place of an existing assembly. The printing device can print using the consumable item contained within the new assembly until the assembly has been depleted of the consumable item or until the assembly is removed from the printing device. For example, an existing toner or inkjet cartridge in the printing device can be replaced with a new toner or inkjet cartridge that constitutes the printing device consumable item assembly. The printing device can print using the replaced consumable item while the assembly remains in the printing device.

Authorization of consumable item reloading or replacement upon successful authentication of the single-use authentication code can occur prior to reloading or replacement. When a printing device runs low on or becomes depleted of print material, the device may not permit consumable item reloading or replacement until successful authentication of the authentication code has occurred. The printing device may have an electromechanical lock that prevents access that allows for consumable item reloading or replacement to occur, and which is not electronically unlocked until authentication is successful.

Authorization of consumable item reloading or replacement upon successful authentication of the single-use authentication code can instead occur after reloading or replacement. After reloading or replacement, usage of the consumable item within a printing device may not be permitted, or continued usage may not be permitted, until successful authentication of the authentication code has occurred. That is, although the consumable item has been replaced or reloaded, the printing device may not print using the consumable item until authentication is successful.

The single-use authentication code on the printing device consumable item assembly authorizes reloading or replacement of any consumable item of the same type as the consumable item contained within the assembly, within any compatible printing device. This means that the consumable item reloaded or replaced within a printing device as authorized using the authentication code on the assembly may not be the consumable item contained within the assembly. Although it is expected that the printing device's consumable item will be reloaded or replaced with the consumable item contained within the assembly upon authentication of the assembly's code, there is nothing preventing a different assembly from being used for consumable item reloading or replacement.

Usage of a single-use authentication code on a printing device consumable item assembly for authorization of reloading ore replacement of any consumable item of the same type as the consumable item within the assembly, within any compatible printing device, can reduce manufacturing costs of the printing device and the assembly itself. Because the printing device is not involved in authentication of the authentication code, the device does not have to include any hardware or other components as the printing device would if it had to verify an actual consumable item, reducing manufacturing costs. While the authentication code is printed on the actual consumable item assembly, manufacturing costs of the assembly may nevertheless be reduced because a more expensive, security-hardened IC does not have to be included, for instance.

The techniques described herein therefore provide an improvement in the technology of printing device consumable item assembly authentication. Rather than direct authentication of a printing device consumable item assembly, the techniques provide for disintermediated such authentication, via direct authentication of a single-use authentication code on the assembly. Once the use authentication code has been successfully authenticated, reloading or replacement of any consumable item of the same type as that contained within the assembly is authorized for reloading or replacement within any compatible printing device.

FIG. 1A shows an example printing device consumable item assembly 100. The consumable item assembly 100 in the example is specifically a print material assembly that is used to reload (i.e., refill) a compatible printing device with print material, such as toner or ink. The consumable item assembly 100 includes a housing 102 that contains the consumable item (i.e., the print material).

The printing device consumable item assembly 100 includes an access port 104 by which the consumable item contained within the assembly 100 is accessible within the housing 102. The access port 104 is temporarily connectable to a corresponding access port of a compatible printing device to transfer the consumable item (i.e., the print material) from the housing 102 to a reservoir of the printing device to refill the reservoir with the consumable item. After the printing device has been refilled, the consumable item assembly 100 can be disconnected from the device. Therefore, when printing using the consumable item reloaded from the assembly 100, the printing device does not have to have the assembly 100 connected to the device.

The printing device consumable item assembly 100 includes a single-use authentication code 106 on the housing 102. The authentication code 106 may be printed on the housing 102, or may be on a label that is affixed to the housing 102. The authentication code 106 may be in the form of a graphical code, such as a QR code or a bar code. The authentication code 106 may instead be encoded within an RFID, NFC, or another type of communication tag. The authentication code 106 provides for one-time authorization of reloading or replacement of any consumable item of the same type as that within the consumable item assembly 100, within any compatible printing device.

A situation can arise in which the single-use authentication code 106 on the printing device consumable item assembly 100 is used to authorize consumable item reloading or replacement within a given printing device, where the actual consumable item reloaded or replaced within the printing device is not the consumable item contained within the assembly 100. In this case, the consumable item assembly 100 may be nefariously resold in new condition. The unsuspecting purchaser of the assembly 100 may be unable to use the consumable item contained within the assembly 100 if the purchaser's printing device has to first verify that consumable item reloading or replacement is authorized. This is because the authentication code 106 can be used just once, and the code 106 has already been used.

Therefore, the single-use authentication code 106 can be initially concealed on the printing device consumable item assembly 100. The authentication code 106 thus has to be revealed before the code 106 is able to be used to authorize consumable item reloading or replacement. Revelation of the authentication code 106 permanently alters the consumable item assembly 100 in a manner indicative that the code 106 has been revealed. As a result, once the authentication code 106 has been irreversibly revealed and used for authorization of consumable item reloading or replacement, attempts to resell the assembly 100 are likely to fail. This is because potential purchasers will suspect that the assembly 100 is not in a new state since the assembly 100 has been permanently altered with the code 106 irreversibly revealed.

FIG. 1B shows one such example technique for initially concealing the single-use authentication code 106 on the housing 102 of the printing device consumable item assembly 100. The authentication code 106 is specifically hidden under a scratch-off opaque covering 108, similar to that found on lottery tickets, for example. Scratching off the opaque covering 108 irreversibly removes the covering 108 to reveal the authentication code 106 underneath. Once scratched off, such as via the edge of a coin, and thus removed, the covering 108 cannot be reapplied to again conceal the authentication code 106.

FIG. 1C shows another example technique for initially concealing the single-use authentication code 106 on the housing 102 of the printing device consumable item assembly 100. The authentication code 106 is specifically hidden under a cap 110 covering the access port 104 of the assembly 100. The cap 110 is irreversibly removable from the printing device assembly 100 to reveal the authentication code 106 underneath. That is, the cap 110 is permanently altered upon removal, preventing reattachment to the access port 104 in a manner that is not visually discernible.

In the example, for instance, the cap 110 includes a pull tab 112 having perforations 114 extending along the side of the cap 110 to the top of the cap 110. The cap 110 is securely attached to the access port 104 in a way that the cap 110 cannot be removed other than by pulling of the pull tab 112 outwards from the housing 102 and causing the tab 112 to tear along the perforations 114. The pull tab 112 may potentially be completely torn off the cap 110, or may remain attached at the top of the cap 110. In either case, the cap 110 has been permanently altered, and cannot be resecured to the access port 104 at least in a way that is not visually discernible.

FIG. 1D shows the cap 110 after the pull tab 112 has been torn along the perforations 114 to remove the cap 110 for revealing the authentication code 106 underneath, specifically in the example in which the tab 112 is completely severed from the cap 110. The cap 110 therefore has a gap 116 where the pull tab 112 has been removed. Even if the cap 110 were successfully reattached to the printing device consumable item assembly 100, the permanent physical alteration of the cap 110 would be readily visibly apparent, because the tab 112 is missing.

Figure 2:
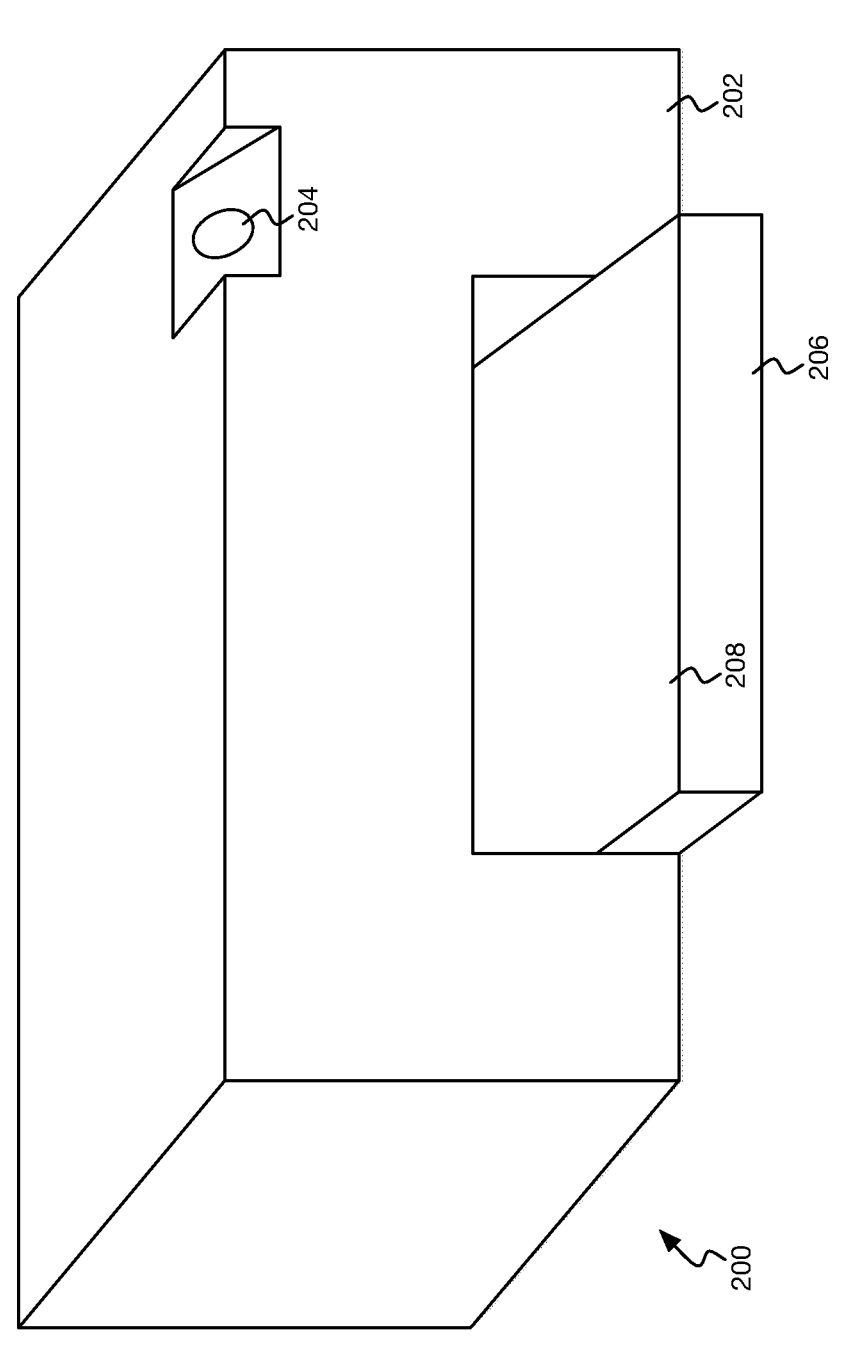
FIG. 2 is a diagram of an example printing device that is receptive to connection of the printing device consumable item assembly of FIG. 1A to reload the printing device with print material from the assembly.

FIG. 2 shows an example printing device 200 that is receptive to consumable item reloading using the described printing device consumable item assembly 100. The printing device 200 may be a standalone printer, such as an inkjet or laser printer. The printing device 200 may instead be an all-in-one (AIO) device, which in addition to printing functionality has other functionality, such as scanning, copying, and/or faxing functionality.

The printing device 200 includes a housing 202 at which an access port 204 is disposed. The access port 204 is receptive to temporary connection of the access port 104 of the printing device consumable item assembly 100 to reload or refill the printing device 200 with the consumable item contained within the housing 102 of the assembly 100. For instance, the printing device 200 may include an internal reservoir that is refilled with print material like toner or ink from the consumable item assembly 100. Once the printing device 200 has been reloaded with the consumable item, the assembly 100 can be removed. The assembly 100 does not have to remain connected to the printing device 200 while printing occurs, in other words.

In the example, the printing device 200 includes an input tray 206, which may also be referred to as a print media cassette, and in which print media such as paper can be loaded for printing by the device 200. The printing device 200 can include an output tray 208, which may be the top surface of the input tray 206, onto which print media such as paper is output after having been printed on by the device 200. The printing device 200 thus can advances print media from the input tray 206 through the housing 202 within which the device 200 prints on the media using the print material previously loaded at the access port 204, and then ejects the print media after printing onto the output tray 208.

In the examples that have been described, the printing device consumable item assembly 100 is specifically a print material assembly that is temporarily connectable to a printing device 200 to reload or refill the device 200 with print material. However, the consumable item assembly 100 may be another type of print material assembly as well. For example, the assembly 100 may be a print material cartridge, such as a toner cartridge or an inkjet cartridge, that is installed in a printing device to replace an existing, depleted cartridge. In this case, the assembly 100 is used for consumable item replacement as opposed to reloading or refilling. The printing device consumable item assembly 100 can also be a consumable item assembly 100 other than a print material assembly, such as a developer roller, an inkjet printhead, and so on.

Figure 3:
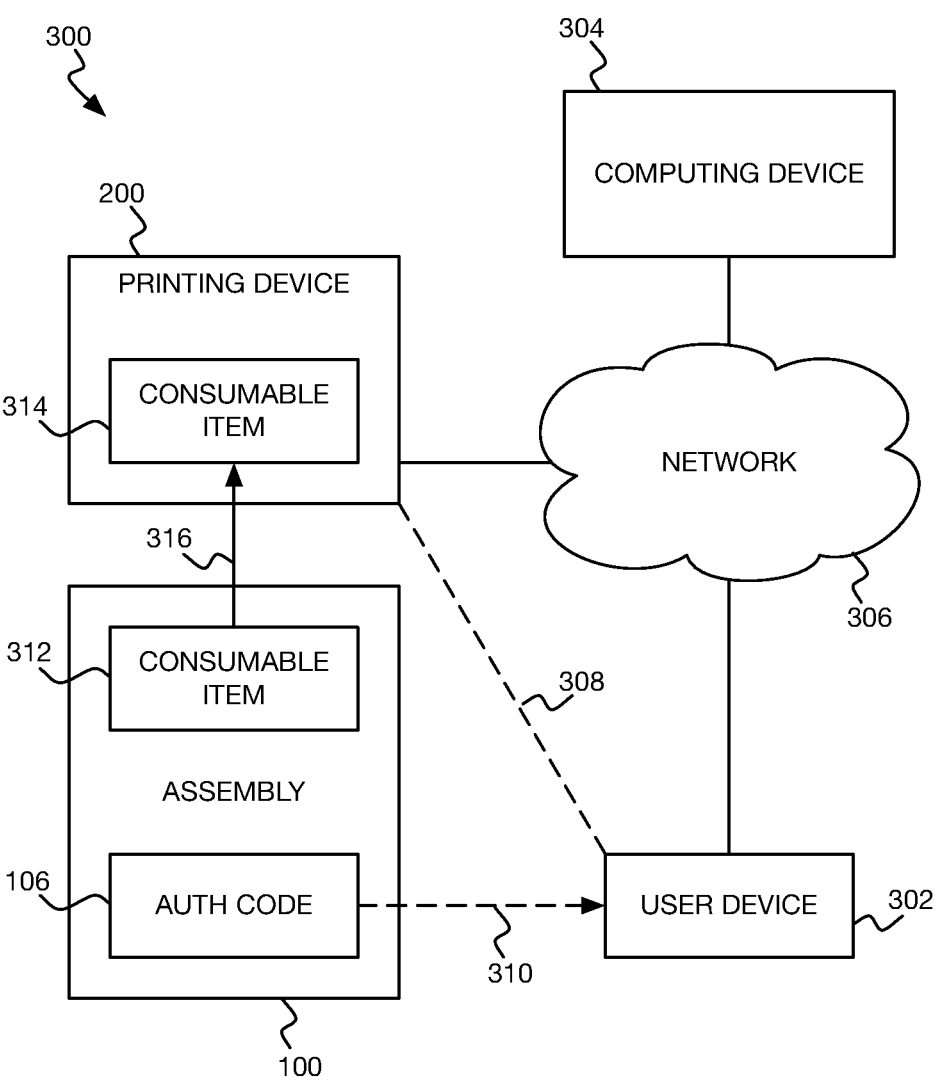
FIG. 3 is a diagram of an example system in which a single-use authentication code on a printing device consumable item assembly is authenticated to authorize reloading or replacement of any consumable item of the same type within a printing device.

FIG. 3 shows an example system 300 in which the single-use authentication code 106 on the printing device consumable item assembly 100 is authenticated to authorize consumable item reloading or replacement within the printing device 200. In addition to the printing device 200, the system 300 in the example includes a user device 302 and a computing device 304. The printing device 200 and the computing device 304 are each communicatively connected to a network 306, and as depicted in the figure, the user device 302 may also be communicatively connected to the network 306.

The user device 302 may be a computing device, such as a mobile computing device like a smartphone or a tablet computing device, or another type of computing device, such as a desktop, laptop, or notebook computer, of an end user of the printing device 200. The computing device 304 can be a server computing device, and is operated by or on behalf of the manufacturer of the printing device 200. The network 306 may be or include the Internet, an intranet, an extranet, a wide-area network, a local-area network, a wireless network, a wired network, and so on.

In the example, both the printing device 200 and the user device 302 are communicatively connected to the network 306, and therefore can communicate with one another over the network 306 and with the computing device 304. In another implementation, the printing device 200 and the user device 302 may be communicatively connected to different networks 306 to which the computing device 304 is also connected. In this case, the printing device 200 and the user device 302 cannot communicate with one another over a centralized network.

In addition or instead, the user device 302 may be directly communicatively connected to the printing device 200, as indicated by dashed line 308. For example, the user device 302 and the printing device 200 may be communicatively connected directly, such as via near-field communication (NFC), Bluetooth, Wi-Fi Direct, or in another manner that may not rely on a separate centralized (e.g., non-peer-to-peer) network like the network 306. In the case of Bluetooth or Wi-Fi Direct, for instance, a peer-to-peer network may be temporarily created by the printing device 200 for direct communication between the printing device 200 and the user device 302.

In basic operation of the system 300, when consumable item reloading or replacement at the printing device 200 has to be authorized, such as before such reloading or replacement occurs or after such reloading or replacement has occurred, the user device 302 inputs the single-use authentication code 106 from the consumable item assembly 100, per dashed arrow 310. The user device 302 provides the authentication code 106 to the computing device 304, either directly over the network 306 or indirectly via the printing device 200. The computing device 304 authenticates the authentication code 106. Upon successful such authentication, the computing device 304 authorizes consumable item reloading or replacement at the printing device 200.

The authorization provided by successful authentication of the single-use authentication code 106 of the consumable item assembly 100 permits consumable item reloading or replacement with any consumable item of the same type as the consumable item 312 contained within the assembly 100. In the example, however, the consumable item 314 of the printing device 200 is reloaded or replaced with the consumable item 312 of the consumable item assembly 100, per arrow 316, as opposed to being reloaded or replaced with the same type of consumable item from a different assembly, for instance. The printing device 200 can use the consumable item 312 that has reloaded or replaced the consumable item 314 within the device 200 because such reloading or replacement has been authorized due to successful authentication of the authentication code 106.

Figure 4A:
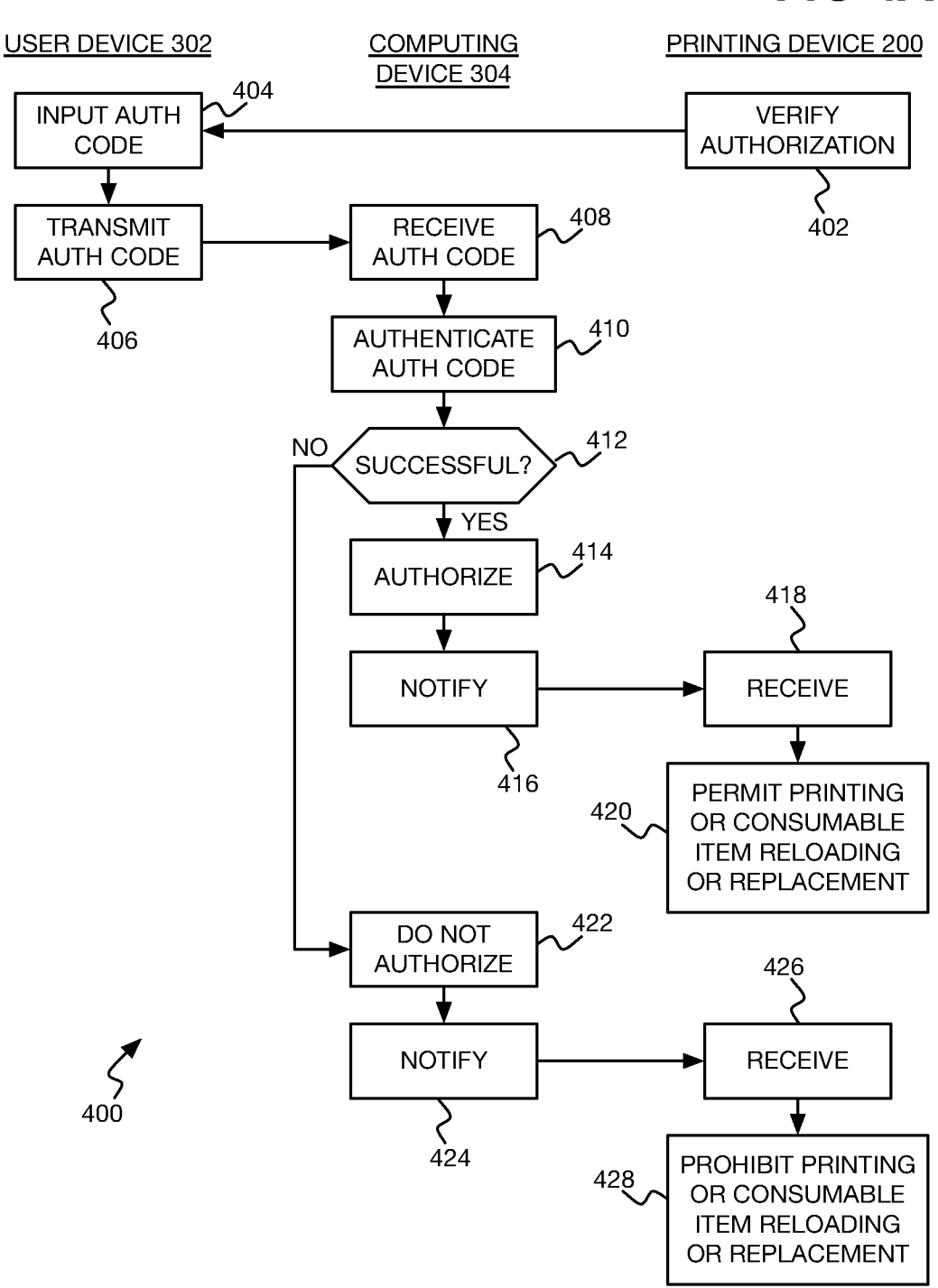
FIGS. 4A and 4B are diagrams of example processes for authenticating a single-use authentication code on a printing device consumable item assembly is authenticated to authorize reloading or replacement of any consumable item of the same type within a printing device.
Figure 4B:
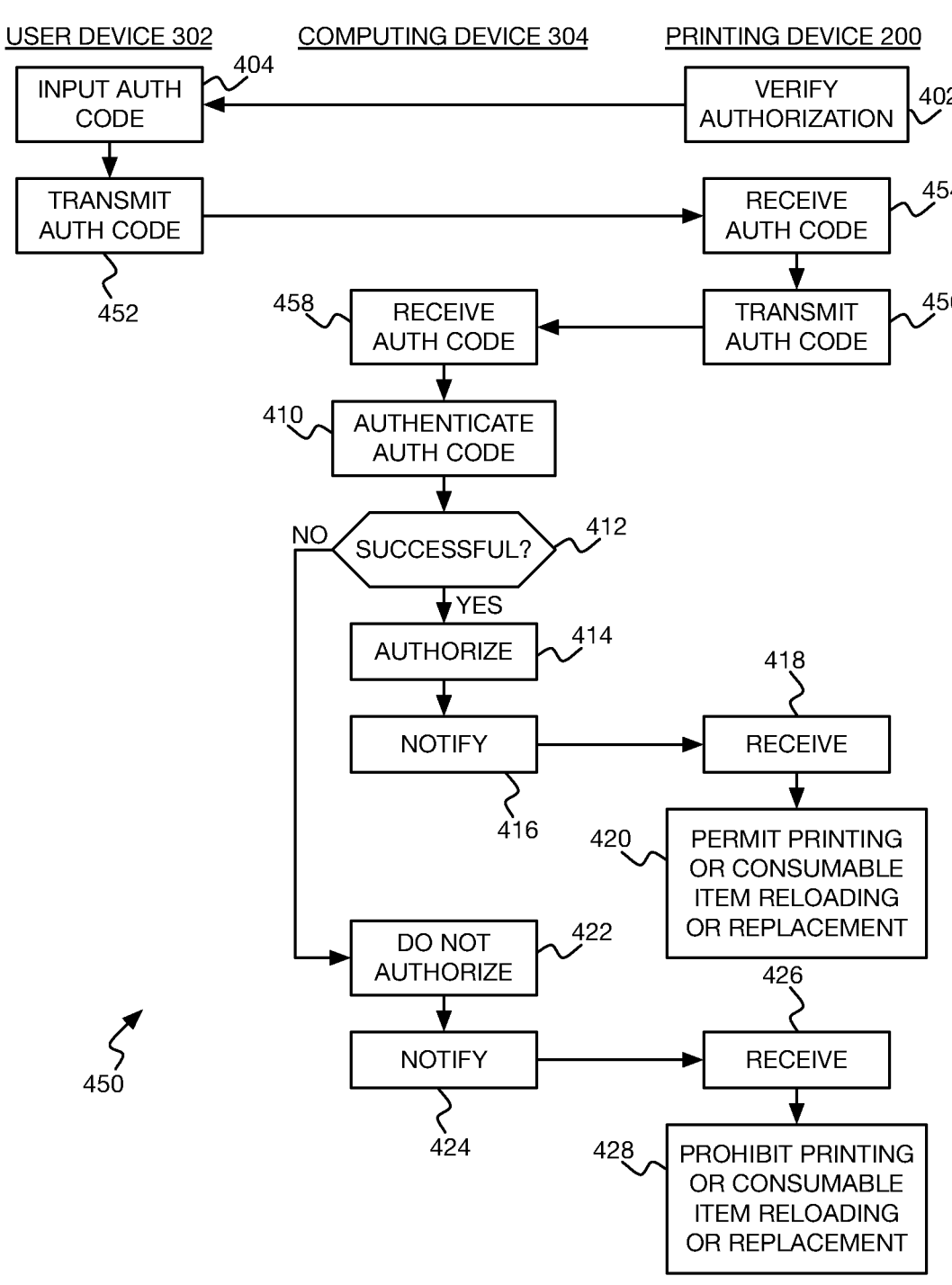

FIGS. 4A and 4B show different example processes 400 and 450, respectively, for authorizing consumable item reloading or replacement. The left parts of the processes 400 and 450 are performed by the user device 302, the middle parts are performed by the computing device 304, and the right parts are performed by the printing device 200. The processes 400 and 450 may be implemented as program code stored on a non-transitory computer-readable data storage medium and executed by a processor of a respective device. As one example, the left parts of the processes 400 and 450 may be implemented as program code that is executed by a processor of the user device 302.

In the process 400 of FIG. 4A, the printing device 200 verifies whether consumable item reloading or replacement at the device 200 is authorized (402). As noted, in one implementation, such reloading or replacement may be authorized before reloading or replacement occurs, in that the printing device 200 does not permit consumable item reloading or replacement until after the device 200 has verified authorization. By comparison, in another implementation, reloading or replacement may be authorized after reloading or replacement has occurred, in that the printing device 200 does not permit reloaded or replaced consumable item usage (or continued such usage) until after the device 200 has verified authorization.

The user device 302 inputs the single-use authentication code 106 from the printing device consumable item assembly 100 (404). The printing device 200, for instance, may communicate with the user device 302 directly to inform that the user device 302 that consumable item reloading or replacement authorization has to be verified, with the user device 302 responsively inputting the authentication code 106. In another case, the printing device 200 may inform the computing device 304 that reloading or replacement authorization has to be verified, with the computing device 304 then informing the user device 302 to responsively input the authentication code 106.

The authentication code 106 may be an identifier that is encrypted by a cryptographic key available to the computing device 304 but not to the user device 302 or the printing device 200. Therefore, the computing device 304 can decrypt the unique identifier using the cryptographic key. The cryptographic key in this example provides for symmetric encryption, in that the same key is used to both encrypt and decrypt the unique identifier. The cryptographic key is securely maintained by the manufacturer of the printing device 200 operating the computing device 304 (or for which the computing device 304 is being operated), or is securely maintained on behalf of the manufacturer.

In another implementation, the identifier that constitutes the authentication code 106 may be cryptographically (i.e., digitally) signed with a private cryptographic key of an asymmetric cryptographic key pair. The private cryptographic key is securely maintained by the manufacturer of the printing device of the printing device 200 operating the computing device 304 (or for which the computing device 304 is being operated), or is securely maintained on behalf of the manufacturer. The private cryptographic key is not available to the computing device 304, the user device 304, or the printing device 200. The computing device 304, however, can verify the digital signature using the corresponding public cryptographic key of the key pair to verify that the authentication code 106 was indeed signed by or on behalf of the manufacturer.

Furthermore, in one implementation, the authentication code 106 may be a unique identifier. That is, each different printing device consumable item assembly 100 has a different identifier and thus a different authentication code 106. In another implementation, a set of different identifiers may be reused. As one example, as different consumable item assemblies 100 are manufacturer, the assemblies 100 may be randomly assigned one of the set of the identifiers as its authentication code 106, or the identifiers to the assemblies 100 in sequence. In this latter implementation, an authentication code 106 once assigned to an assembly may not be assigned to another assembly 100 for a specified length of time. Therefore, the code 106 can be used just once for authentication purposes during a given time period such that the authentication code 106 is still considered a single-use code during that time period.

The user device 302 may input the authentication code 106 in a variety of different manners. As noted, the authentication code 106 may be in the form of a graphical code, such as a QR code, that the user device 302 optically scans by capturing an image of the code 106 and decoding the authentication code 106 from the captured image. The authentication code 106 may be in the form of a communication tag, such as an RFID tag, that the user device 302 wirelessly reads using a corresponding transceiver or receiver. The authentication code 106 may as another example be in the form of a series of characters that a user of the user device 302 manually enters at the device 302.

In the process 400, the user device 302 transmits the authorization code 106 over the network 306 to the computing device 304 (406), which thus receives the authentication code 106 over the network 306 from the user device 302 (408). In addition to the authentication code 106, the user device 302 may also provide the identity of the printing device 200 for which consumable item reloading or replacement authorization is being requested. The computing device 304 then authenticates the authentication code 106 (410). If the authentication code 106 has been symmetrically encrypted with a cryptographic key as noted above, the computing device 304 may first decrypt the authentication code 106 using the same cryptographic key.

The computing device 304 may authenticate the received authentication code 106 in a variety of different manners. For example, the computing device 304 may verify that the authentication code 106 is a legitimate authentication code. The authentication code 106 may be generated in a manner known just to the manufacturer of the printing device 200, for instance, such that if the authentication code 106 is not in the form of a legitimate such code, authentication of the authentication code 106 will fail. The authentication code 106 may be looked up against a list of authentication codes generated by or for the manufacturer, such that authentication fails if the code 106 is not present within this list.

The computing device 304 also verifies that that the authentication code 106 has not been previously redeemed. That is, the computing device 304 verifies that the authentication code 106 has not been previously used to authorize consumable item reloading or replacement at the printing device 200 or at any other printing device. As such, the authentication code 106 can be used just once. Once the authentication code 106 has been redeemed to authorize consumable item reloading or replacement at any printing device—even one other than the printing device 200 of the user that first received the assembly 100—the code 106 cannot be reused to authorize another occurrence of consumable item reloading or replacement at the same or different printing device. That is, even if the authentication code 106 is legitimate, if the code 106 has already been redeemed, current authentication of code 106 will fail.

If authentication of the authentication code 106 is successful (412), then the computing device 304 authorizes consumable item reloading or replacement at the printing device 200 (414). That is, computing device 304 redeems the authentication code 106 to authorize reloading or replacement of any consumable item as the same type as the consumable item 312 within the assembly 100, at the printing device 200. The computing device 304 may know the particular printing device 200 at which consumable item reloading or replacement is to be authorized as a result of having received the identity of the printing device 200 from the user device 302, as noted above.

The redemption of the authentication code 106 to authorize consumable item reloading or replacement at the printing device 200 can occur without the code 106 having to be loaded onto any account with which the user device 302 and/or the printing device 200 are associated. For example, a user may be participating in a subscription program operated by or on behalf of the manufacturer of the printing device 200 to automatically receive a new consumable item for reloading or replacement at the device 200 when the existing consumable item within the printing device 200 is running low. The user may therefore have an account identifying the printing device 200, where the user logs into the account at the computing device 304 using the user device 302. In this respect, both the printing device 200 and the user device 302 are associated with the account and thus with one another.

However, the authentication code 106 on the consumable item assembly 100 provided to the user in accordance with the subscription program may not be assigned or otherwise loaded onto the user's account. Rather, the authentication code 106 in this case is associated just with the overall subscription program itself, and can be redeemed by any user participating in the program, and not just the user who received the assembly 100. This means that redemption of the authorization code 106 to authorize consumable item or reloading or replacement at the printing device 200 does not depend on the authentication code 106 having to be loaded onto the account, either prior to or as a part of such redemption.

Not loading the authorization code 106 onto the account of the user to which the consumable item assembly 100 has been shipped or otherwise provided reduces the accounting and other code tracking that may otherwise have to be performed in managing the subscription program. Furthermore, not loading the authorization code 106 in this respect can improve user experience. For example, a user may have multiple printing devices 200 that are part of the program.

Because the authorization code 106 is not tied to a particular printing device 200, the user can use the authorization code 106 for either printing device 200 for authorizing consumable item reloading or replacement, without having to track which device 200 the consumable item assembly 100 including the code 106 was intended.

Responsive to successful authentication of the authentication code (412) and consumable item reloading or replacement authorization (414), the computing device 304 notifies the printing device 200 over the network 306 that such reloading or replacement has been authorized (416). The printing device 200 thus receives a notification from the computing device 304 that reloading or replacement of the (installed) consumable item 314 within the device 200 by the consumable item 312 within the assembly 100 or any other compatible consumable item has been authorized (418). The printing device 200 responsively ultimately permits printing or consumable item reloading or replacement (420). That is, the printing device 200 permits printing using the consumable item 314 as has already been reloaded or replaced or after the item 314 has been reloaded or replaced, or permits reloading or replacement of the consumable item 314.

By comparison, if authentication of the authentication code 106 is unsuccessful (412), then the computing device 304 does not authorize consumable item reloading or replacement at the printing device 200 (422). The computing device 304 responsively notifies the printing device 200 over the network 306 that such reloading or replacement has not been authorized (424). The printing device 200 thus receives a notification from the computing device 304 that reloading or replacement of the (installed) consumable item 314 within the device 200 by the consumable item 312 within the assembly 100 or any other compatible consumable item has not been authorized (426). The printing device 200 responsively prohibits printing or consumable item reloading or replacement (428). That is, the printing device 200 prohibits printing using the consumable item 314 as has already been reloaded or replaced or after the item 314 has been reloaded or replaced, or prohibits reloading or replacement of the consumable item 314.

In the process 450 of FIG. 4B, the printing device 200 again verifies whether consumable item reloading or replacement at the device 200 is authorized (402). As before, the user device 302 inputs the single-use authentication code 106 from the printing device consumable item assembly 100 (404). However, unlike in the process 400, the user device 302 in the process 450 transmits the authentication code 106 directly to the printing device 200 (452), which thus receives the authentication code 106 from the user device 302 (454).

The printing device 200 may receive the authentication code 106 from the user device 302 over the same network 306 by which the devices 200 and 302 are communicatively connected to the computing device 304, or over a different network 306 than that by which the devices 200 are communicatively connected to the computing device 304. The printing device 200 may instead receive the authentication code 106 from the user device 302 in a non-centralized network manner, such as in the case of a Bluetooth, NFC, or other type of peer-to-peer connection, as noted above. The printing device 200 then transmits the authentication code 106 over the network 306 to the computing device 304 (456), which thus receives the code 106 from the device 200 (458).

In the process 450, the user device 302 can still be considered as transmitting the authentication code 106 to the computing device 304, but indirectly via the printing device 200 instead of directly as in the process 400. Having the printing device 200 transmit the authentication code 106 directly to the computing device 304 instead of the user device 302 means that the user device 302 does not have to be communicatively connected to the computing device 304 over the network 306. Rather, the user device 302 effectively serves as an input device to input the authentication code 106 for the printing device 200.

Furthermore, having the printing device 200 transmit the authentication code 106 directly to the computing device 304 instead of the user device 302 means that printing device 200 does not have to provides its identity to the user device 302 in such a way that the computing device 304 can determine the particular printing device 200 for which consumable item reloading or replacement is to be authorized. In the process 400, by comparison, along with the authorization code 106 the user device 302 has to transmit the identity of the printing device 200 to the computing device 304, so that the device 304 knows which printing device 200 to send a notification regarding unsuccessful or successful consumable item reloading or replacement authorization. In the process 450, the computing device 304 knows the identity of the printing device 200 because the computing device 200 receives the authentication code 106 from this printing device 200.

The remainder of the process 450 is similar to the process 400. The computing device 304 authenticates the received authentication code 106 (410). If authentication is successful (412), then the computing device 304 redeems the code 106 to authorize consumable item reloading or replacement at the printing device 200 (414), and notifies the printing device 200 (416). The printing device 200 receives notification of the successful authorization (418), and permits printing or consumable item reloading or replacement (420). If authentication is unsuccessful (412), then the computing device 304 does not authorize consumable item reloading or replacement at the printing device (422), and similarly notifies the printing device 200 (424). The printing device 200 receives notification of the unsuccessful authorization (426), and prohibits printing or consumable item reloading or replacement (428).

Figure 5:
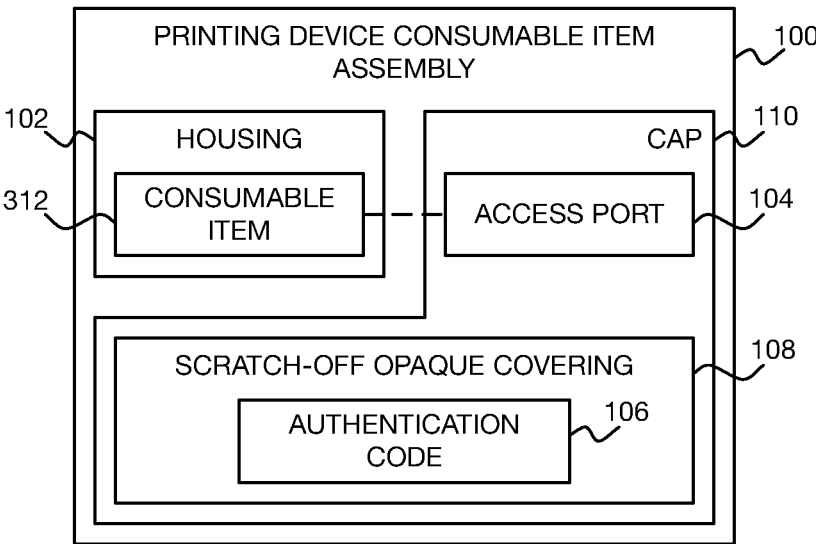
FIG. 5 is a block diagram of an example printing device consumable item assembly.

FIG. 5 shows a block diagram of the example printing device consumable item assembly 100. The consumable item assembly 100 includes a housing 102 containing a consumable item 312 that any compatible printing device uses to print. The assembly 100 includes a single-use authentication code 106 on the housing 102. The authentication code 106 authorizes reloading or replacement of any consumable item of a same type as the consumable item within any compatible printing device.

The consumable item assembly 100 can include an access port 104 by which the consumable item 312 is accessible within the housing 102. The access port is temporarily connectable to a corresponding access port of a compatible printing device to transfer the consumable item 312 from the housing 102 to a reservoir of the compatible printing device to refill the reservoir with the consumable item 312. The assembly 100 can include a scratch-off opaque covering 108 and/or a cap 110.

The single-use authentication code 106 is concealed under the scratch-off opaque covering 108. The opaque covering 108 is irreversibly removable to reveal the authentication code 106 in that the covering 108 cannot be reapplied upon removal. The cap 110 covers the access port 104 and conceals the authentication code 106 (as may or may not be covered by a scratch-off opaque covering 108). The cap 110 is irreversibly removable to reveal the authentication code 106 in that the cap 110 is permanently altered upon removal, preventing reattachment of the cap 110 to the access port 104 in a manner that is not visually discernible.

Figure 6:
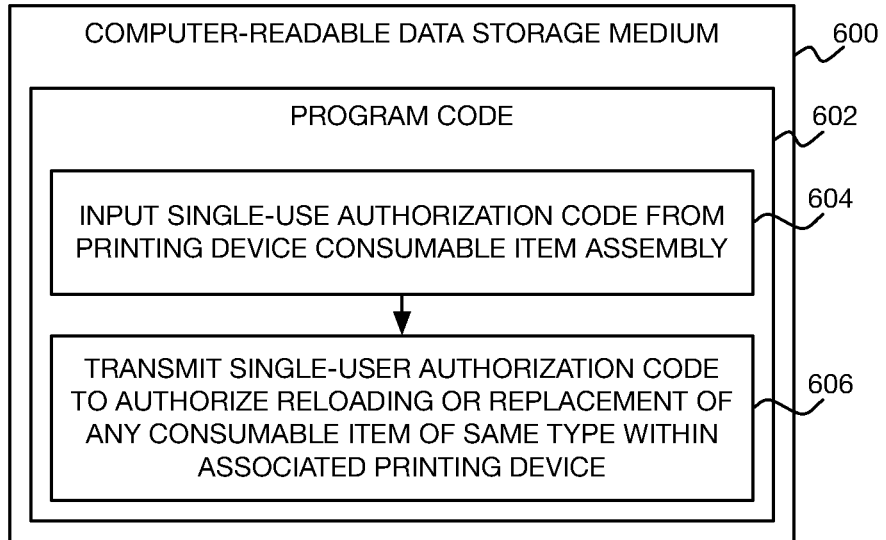
FIG. 6 is a diagram of an example non-transitory computer program-readable data storage medium.

FIG. 6 shows an example computer-readable data storage medium 600 storing program code 602 executable by the user device 302 to perform processing. The processing includes inputting a single-use authentication code 106 from a printing device consumable item assembly 100 containing a consumable item 312 (604). The authentication code 106 authorizes reloading or replacement of any consumable item of a same type as the consumable item 312 within any compatible printing device.

The processing includes transmitting the authentication code 106 to a computing device 304 for authentication and to authorize reloading or replacement of any consumable item of the same type within a printing device 200 associated with the user device 302 (606). The authentication code 106 may be directly transmitted to the computing device 304, or indirectly via the printing device 200. Any consumable item of the same type as that within the consumable item assembly 100 is thus authorized for reloading or replacement within the printing device 200 upon successful authentication of the authentication code 106 by the computing device 304.

FIG. 7 shows an example method 700. The method 700 is performed by the computing device 304. The method 700 may be implemented as program code stored on a non-transitory computer-readable data storage medium and executed by a processor of the computing device 304. The method 700 includes receiving, from a user device 302 or a printing device 200, a single-use authentication code 106 on a printing device consumable item assembly 100 containing a consumable item 312 (702). The authentication code 106 authorizes reloading or replacement of any consumable item of a same type as the consumable item 312 within any compatible printing device. The method 700 includes authenticating the authentication code 106 (703), and can include responsively redeeming the code 106 to authorize reloading or replacement of any consumable item of the same type within the printing device 200 (704). The method 700 therefore includes, upon successful authentication, authorizing reloading or replacement of any consumable item of the same type within the printing device 200 (706).

Figure 8:
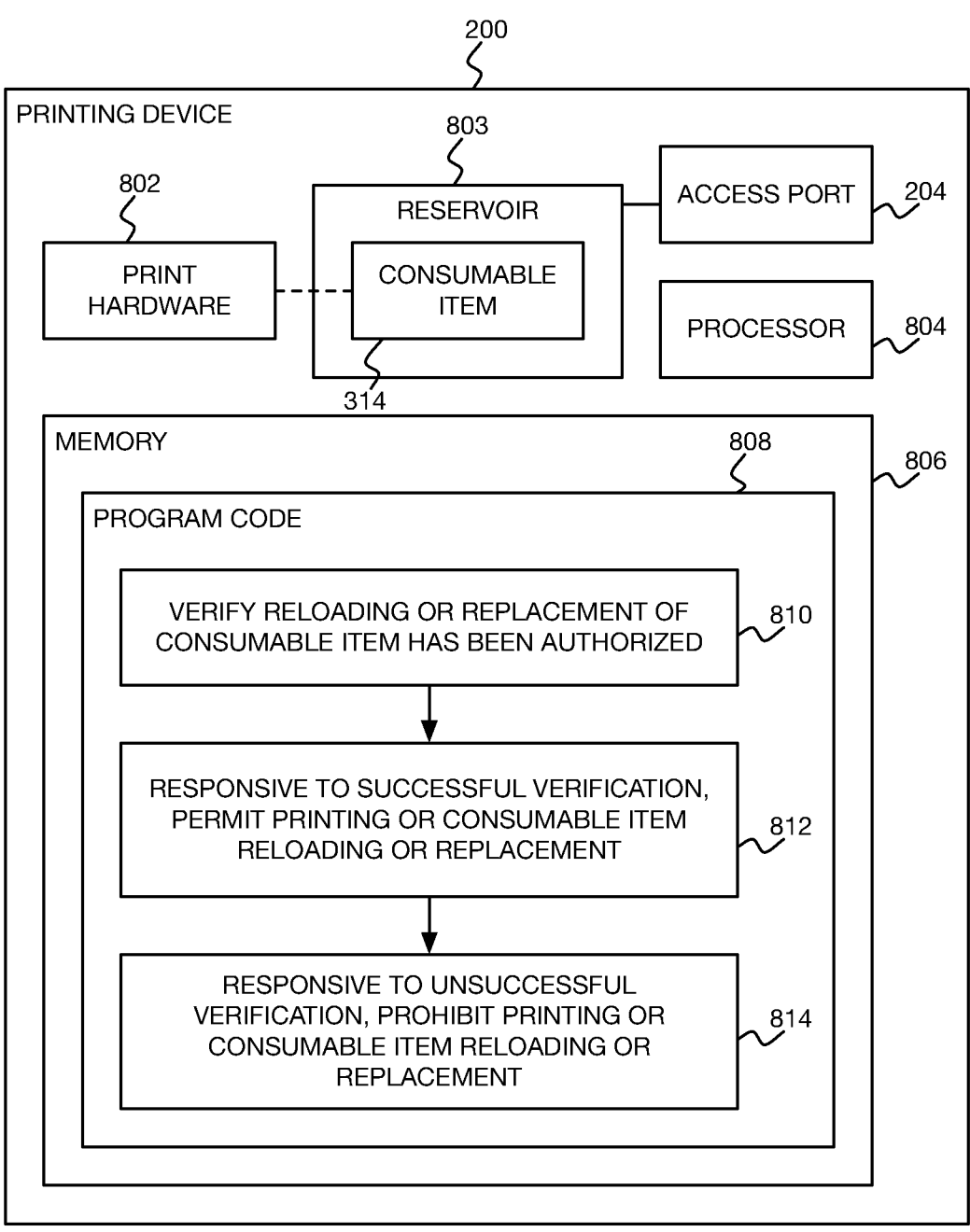
FIG. 8 is a block diagram of an example printing device.

FIG. 8 shows a block diagram of the example printing device 200. The printing device 200 includes print hardware 802 to print using an installed consumable item 312. The print hardware 802 may be or include mechanical and electrical components and circuitry by which print material is output, such as onto print media like paper, to form images, for instance. The print hardware 802 may include laser-printing hardware, inkjet-printing hardware, or another type of print hardware. The installed consumable item 312 may be contained within a reservoir 803 that is accessible via an access port 204. The printing device 200 also includes a processor 804 and a memory 806 storing program code 808 executable by the processor 804 to perform processing.

The processing includes, responsive to the installed consumable item 314 having to be replaced or reloaded or having been replaced or reloaded, verifying that reloading or replacement of the installed consumable item 314 has been authorized (810). The processing includes, responsive to successful verification, permitting printing with the installed consumable item 314 as has been reloaded or replaced or after the installed consumable item 314 has been reloaded or replaced, or permitting reloading or replacement of the installed consumable item 314 (812).

The processing includes, responsive to unsuccessful verification, prohibiting printing with the installed consumable item 314 as has been reloaded or replaced or after the installed consumable item 314 has been reloaded or replaced, or prohibiting reloading or replacement of the installed consumable item 314 (814). Reloading or replacement of the installed consumable item 314 is authorized via successful authentication of a single-use authentication code 106 on a printing device consumable item assembly 100 containing a consumable item 312. The authentication code 106 authorizing reloading or replacement of any consumable item of a same type as the consumable item 312 within any compatible printing device.

Techniques have been described for authorizing consumable item reloading or replacement within a printing device. Such authorization is provided by a single-use authentication code on a printing device consumable item assembly that includes a consumable item. Usage of such an authentication code as has been described means that the printing device itself does not have to read any security device or other feature on the assembly, reducing manufacturing cost of the printing device and/or the assembly. Instead, a user device is leveraged to input the authentication code on which basis authorization occurs.

We claim:

1. A printing device consumable item assembly comprising:
   a housing containing a consumable item that any compatible printing device uses to print;
   a single-use authentication code on the housing, the single-use authentication code authorizing reloading or replacement of any consumable item of a same type as the consumable item within any compatible printing device;
   an access port by which the consumable item is accessible within the housing; and
   a cap covering the access port and concealing the single-use authentication code, the cap irreversibly removable to reveal the single-use authentication code in that the cap is permanently altered upon removal, preventing reattachment of the cap to the access port in a manner that is not visually discernible.

2. The printing device consumable item assembly of claim 1, wherein the single-use authentication code authorizes reloading or replacement of any consumable item of the same type within any compatible printing device in that successful authentication of the single-use authentication code permits any consumable item of the same type to be reloaded or replaced within any compatible printing device.

3. The printing device consumable item assembly of claim 1, wherein the single-use authentication code authorizes reloading or replacement of any consumable item of the same type within any compatible printing device in that successful authentication of the single-use authentication code permits usage of any consumable item that has been reloaded or replaced within any compatible printing device.

4. The printing device consumable item assembly of claim 1, wherein the access port is temporarily connectable to a corresponding access port of a compatible printing device to transfer the consumable item from the housing to a reservoir of the compatible printing device to refill the reservoir with the consumable item.

5. The printing device consumable item assembly of claim 1, wherein the consumable item comprises toner or ink.

6. A method comprising:
   receiving, by a computing device from a user device or directly from a printing device associated with the user device, a single-use authentication code on a printing device consumable item assembly containing a consumable item, the single-use authentication code authorizing reloading or replacement of any consumable item of a same type as the consumable item within any compatible printing device;

authenticating, by the computing device, the single-use authentication code;

upon successful authentication of the single-use authentication code, authorizing, by the computing device, reloading or replacement of any consumable item of the same type within the printing device; and redeeming, by the computing device, the single-use authentication code to authorize reloading or replacement of any consumable item of the same type within the printing device, without the single-use authentication code having to be loaded onto any account with which both the user device and the printing device are associated.

7. A printing device comprising:

print hardware to print using an installed consumable item;

a processor; and a memory storing program code executable by the processor to:

responsive to the installed consumable item having to be replaced or reloaded or having been replaced or reloaded, verify that reloading or replacement of the installed consumable item has been authorized;

responsive to successful verification that reloading or replacement of the installed consumable item has been authorized, permit printing with the installed consumable item as has been reloaded or replaced or after the installed consumable item has been reloaded or replaced, or permit reloading or replacement of the installed consumable item; and responsive to unsuccessful verification that reloading or replacement of the installed consumable item has been authorized, prohibit printing with the installed consumable item as has been reloaded or replaced or after the installed consumable item has been reloaded or replaced, or prohibit reloading or replacement of the installed consumable item, wherein reloading or replacement of the installed consumable item is authorized via successful authentication of a single-use authentication code on a printing device consumable item assembly containing a consumable item, the single-use authentication code authorizing reloading or replacement of any consumable item of a same type as the consumable item within any compatible printing device.

8. The printing device of claim 7, wherein the program code is executable by the processor to further:

transmit the single-use authentication code to a computing device for authentication;

responsive to successful authentication of the single-use authentication code, receive from a computing device a notification that reloading or replacement of the installed consumable item has been authorized; and responsive to unsuccessful authentication of the single-use authentication code, receive from the computing device a notification that reloading or replacement of the installed consumable item has not been authorized.

9. The printing device of claim 7, wherein a user device with which the printing device is associated is to transmit the single-use authentication code to a computing device for authentication, and the program code is executable by the processor to further:

responsive to successful authentication of the single-use authentication code, receive from a computing device a notification that reloading or replacement of the installed consumable item has been authorized; and responsive to unsuccessful authentication of the single-use authentication code, receive from the computing device a notification that reloading or replacement of the installed consumable item has not been authorized.

10. The printing device of claim 7, wherein the consumable item comprises toner or ink, and the printing device further comprises:

a reservoir; and an access port to which a corresponding access port of a compatible printing device consumable item assembly is connected to refill the reservoir with the toner or ink from the compatible printing device consumable item assembly.

* * * * *